United States Patent [19]

Guldener et al.

[11] 4,059,250
[45] Nov. 22, 1977

[54] STOP VALVE WITH A SPHERICAL STOPCOCK

[75] Inventors: Erich Guldener, Uhwiesen; Paul Trösch, Schaffhausen, both of Switzerland

[73] Assignee: Georg Fischer Aktiengesellschaft, Schaffhausen, Germany

[21] Appl. No.: 642,385

[22] Filed: Dec. 19, 1975

[30] Foreign Application Priority Data

Dec. 24, 1974 Switzerland .................. 17262/74

[51] Int. Cl.² ............................................. F16K 5/00
[52] U.S. Cl. .................................. 251/304; 251/315; 277/40
[58] Field of Search ................... 277/40, 187, 189; 251/315, 316, 171, 192, 188, 362, 304

[56] References Cited

U.S. PATENT DOCUMENTS

| | | | |
|---|---|---|---|
| 2,995,336 | 8/1961 | Usab | 251/315 |
| 3,033,227 | 5/1962 | Goldman | 251/192 |
| 3,039,484 | 6/1962 | Bredtschneider | 251/315 |
| 3,096,965 | 7/1963 | Margus et al. | 251/315 |
| 3,128,105 | 4/1964 | Liebig | 277/187 |
| 3,182,952 | 5/1965 | Montesi | 251/315 |
| 3,245,655 | 4/1966 | Oetjens | 251/315 |
| 3,269,691 | 8/1966 | Meima et al. | 251/188 |
| 3,550,902 | 12/1970 | Pidgeon et al. | 251/151 |
| 3,552,752 | 1/1971 | Lojkutz | 277/40 |
| 3,731,904 | 5/1973 | Valince | 251/315 |

FOREIGN PATENT DOCUMENTS 1,023,753   3/1966   United Kingdom .................. 277/40

*Primary Examiner*—William R. Cline
*Assistant Examiner*—H. Jay Spiegel
*Attorney, Agent, or Firm*—Toren, McGeady and Stanger

[57] ABSTRACT

A stop valve includes a housing formed with a continuous cylindrical bore; a pair of connecting sleeves are disposed one at each end of the housing and are coupled to it by means of coupling nuts. A spherical stopcock coupled to a shaft is positioned in the bore in the housing along with two sealing rings each adjacent to an opposite side of the stopcock, and two insert rings each arranged to push a different one of the sealing rings into contact with the stopcock. The insert rings are insertable into and held within the housing bore by bayonet-like points. A certain amount of axial play is provided between the connecting sleeves and the housing which is adjustable via the coupling units.

4 Claims, 4 Drawing Figures

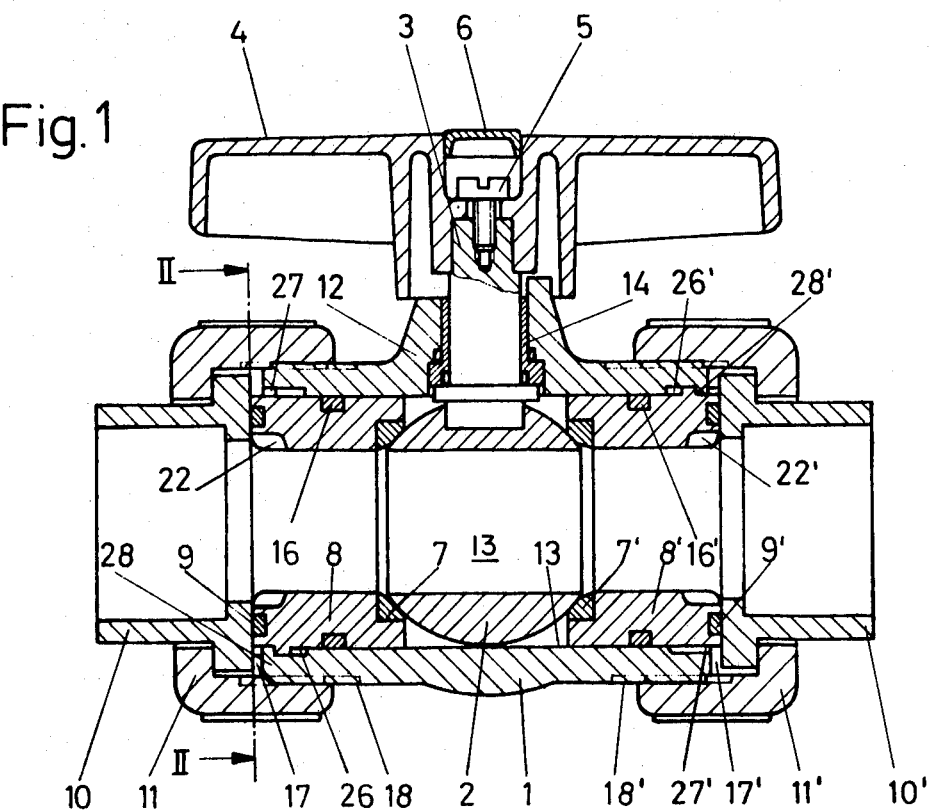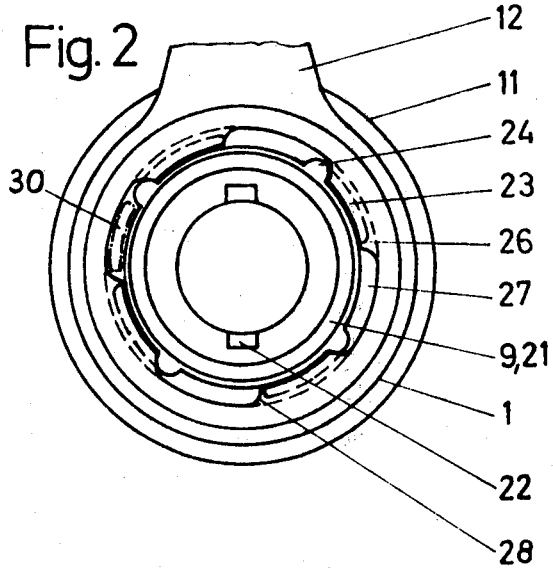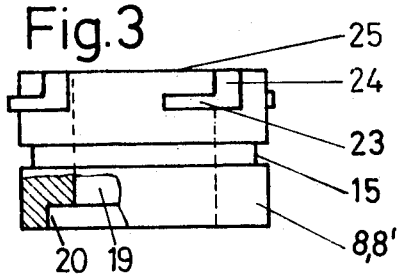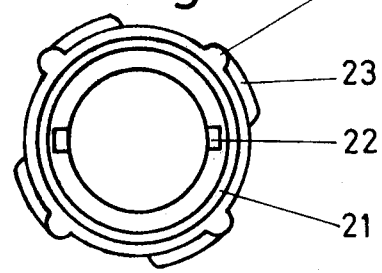

STOP VALVE WITH A SPHERICAL STOPCOCK

BACKGROUND OF THE INVENTION

1. Field of the Invention

The field of the present invention relates to a stop valve.

2. Description of the Prior Art

From the German Patent DT-Gbm 1,941,145 a stop valve is known in which insert rings laterally adjacent to a stopcock are axially screwed into a bore in a housing, the bore is open at each end, and the insert rings press against the stopcock on turning or twisting sealing rings. This stop valve has the disadvantage that a readjustment of both sealing rings adjacent to the stopcock by means of the insert rings is only possible upon disassembling the stop valve to a considerable extent, i.e., loosening the coupling nuts, and removal of the valve from the piping. This stop valve carries with it the additional risk that flowing fluids, or fluids carrying sediment reach the threaded connection or coupling between the housing and the insert rings and cause a more difficult readjustment or resetting of the sealing rings after some lapse of time, or a more difficult disassembly of the insert rings from the housing.

Additionally, a stop valve is disclosed in U.S. Pat. No. 3,550,902 which differs from the aforedescribed valve in that the housing is formed on one side as an applicance with an inserted sealing ring for the stopcock, and on the other side of the housing contains only a loosely fitted insert ring having a sealing ring, the insert ring being kept in position by an adjacent connecting sleeve, as well as by a coupling nut screwed over the housing and extending over the coupling or connecting sleeve. Although the insert ring is axially displaceable and, therefore, readjustable by tightening the coupling nut without removal of the cock, the stopcock is thereby displaced from the center of the actuating shaft and can no longer be operated in a central position and develops a tendency to jam. A further disadvantage is that the stopcock can only be installed in a position in which the insert ring is disposed on the pressure side of the stop valve. Furthermore the seal installed in the depth of the housing wears out more quickly due to being subjected to a higher pressure as a result of the predetermined insert position, and is additionally difficult to exchange.

OBJECT OF THE INVENTION

It is accordingly an object of the present invention to devise a stop valve of the type in which both seals adjacent to the stopcock are readjustable from the exterior, which is insertable in an arbitrary direction of flow in piping, and in which the housing is formed symmetrically with a continuous cylindrical bore.

SUMMARY OF THE INVENTION

The stop valve, according to the present invention, features a plurality of recesses being formed in and uniformly spaced apart on the inner circumference of the housing as defined by the bore near the front sides of the housing, and a plurality of corresponding lips extending from the housing; the recesses communicate axially with a circular groove formed within the housing, and the grooves and the recesses are located on opposite sides of the lips, respectively. The insert rings are axially slidable and rotatable into the bore from both ends of the housing, and include dogs extending into the recesses, and behind the lips, respectively.

BRIEF DESCRIPTION OF THE DRAWING

FIG. 1 shows a longitudinal section in a symmetrical plane through a stop valve in the open position;

FIG. 2 shows a side elevational view along the line II — II of FIG. 1, the coupling nut and the connecting sleeve being omitted;

FIG. 3 shows an elevational view, partly in section, of an insert ring; and

FIG. 4 shows a side elevational view of the insert ring of FIG. 3.

DESCRIPTION OF THE PREFERRED EMBODIMENT

Referring now to the drawing, a housing 1 is formed with a tubular projection 12 in which there is disposed a sleeve 14. A shaft or trunnion 3 is rotatably positioned within the sleeve 14 and a handle 4 is mounted on one end of the shaft 3 which extends from the projection 12. The handle 4 is attached to the shaft by a screw 5 covered by a cap 6.

The housing 1 has a continuous bore 13 in which a stopcock 2 is positioned. The stopcock has a diametrically drilled opening 13' and is attached to the end of the shaft 3 projecting into the bore 13, so that the stopcock 2 is actuable by the handle 4 over the shaft 3.

Insert rings 8, 8' are placed on the opposite sides of the stopcock 2 within the continuous bore 13. Seals 16, 16' each encircle one insert ring 8, 8', respectively, and provide a seal with the juxtaposed surface of the bore. Further, sealing rings 7, 7' are each fitted into the end of a different one of the insert rings, respectively, adjacent the stopcock 2.

The insert rings 8, 8' each have a bore 19 with an annular groove 20 formed in one end into which the sealing ring 7, 7', respectively, are fitted. As shown in detail in FIG. 4, two oppositely disposed recesses 22, 22' are formed in each of the opposite ends of the insert rings 8, 8', respectively, as best seen in FIG. 1, for twisting the insert ring into the continuous bore 13 of the housing 1. The insert rings 8, 8' each have an annular recess 15 formed on its outer surface into which seals 16, 16', respectively, seat, and at the end 25 of each which is spaced from the stopcock 2 there is an annular groove 21 for the one of the seals 9, 9'. Starting from the end 25 there are disposed on the outer periphery of each of the insert rings 8, 8' and equally spaced thereon, in the example shown, four contact-type dogs 24 which are parallel to the axis of the insert ring 8, 8' and each merges into a separate guide-type dog 23 extending in the circumferential direction of the outer surface and parallel to the end 25. Each of the insert rings 8, 8' is axially dimensioned so that with its associated sealing ring 7, 7' it projects, in the assembled state, a little beyond the end of the housing 1, and the combined overhang or projecting length of the insert rings 8, 8' is tailored to the nominal width of the stop valve.

Each of the housing 1 is provided with an outer thread 18, 18', and a clamping nut 11, 11' is screwed on each outer thread, respectively. The clamping nuts have inwardly directed flanges extending over corresponding flanges on connecting sleeves 10, 10', respectively. The connecting sleeves 10', 10' push against the ends 25 of insert rings 8, 8', respectively, and contact the seals 9, 9'. Gaps 17, 17' are formed between the flanges of the connecting sleeves 10, 10' and the ends of the housing, respectively and provide play for readjusting or resetting the sealing rings 7, 7' against the stopcock 2.

To secure the insert rings 8, 8' disposed in the continuous bore 13 of the housing 1, each end of the housing 1 has four inwardly projecting lips 28, 28' respectively spaced equidistantly apart around the bore. Four recesses 27, 27' are formed in the bore each extending between a pair adjacent lips 28, 28', respectively. The recesses 27, 27' extend inwardly in the axial direction of the bore and open into an annular groove 26, 26', respectively, formed into the surface of the bore 13.

During assembly of the insert rings 8, 8', the guide-type dogs 23, 23' are each aligned with one of the recesses 27, 27' and subsequently the insert rings 8, 8' are slid or fitted into the bore 13, until the sealing rings 7, 7' are in contact with the stopcock 2. Then the insert rings 8, 8' are turned about their axes until the guide-type dogs 23, 23' are positioned in the grooves 26 behind the lips 28, 28', and the contact-type dogs 24 are in contact with the end edges of the lips 28, 28'.

The width of the grooves 26, 26' is dimensioned in accordance with the guide-type dogs 23, 23' disposed in the grooves in the assembled state of the stop valve to provide an axial play corresponding to the gaps 17, 17' so that the insert rings 8, 8' can be individually and axially reset or readjusted together with the sealing rings 7, 7' with respect to the stopcock 2 by means of the coupling nuts 11, 11'.

To secure each insert ring 8, 8' against subsequent twisting and, therefore, against an unintentional release, it is possible to fit or insert a correspondingly dimensioned contact wedge 30 loosely within one of the recesses 27, 27' as shown in dashed line in FIG. 2.

The stop valve described has the advantage that the pressing force of the sealing rings disposed in the insert rings exerted upon the stopcock is uniformly adjustable from both sides by means of the coupling nuts, which ensures optimal sealing, a good alignment of the stopcock with the axis of its actuating shaft, as well as relatively little wear of the sealing rings.

The stop valve does not, furthermore, use any parts implemented for right-hand or left-hand direction so that these parts are mutually exchangeable; this permits a simpler manufacture and less storage of parts. It is furthermore possible to insert this stop valve in an arbitrary position without regard to the direction of flow of the medium.

Although the invention has been described with respect to a preferred version thereof, it is to be understood that it is not to be so limited since changes can be made therein which are within the full intended scope of the appended claims.

What is claimed is:

1. A stop valve comprising:
a housing having two ends with a continuous cylindrical bore extending between the ends;
a connecting sleeve positioned at and located outwardly of each housing end;
coupling-nut means for connecting said connecting sleeves to said housing, said coupling-nut means being displaceably attachable to said housing and slidably displaceable along said connecting sleeve,
a stopcock disposed in the bore in said housing and spaced from the ends thereof;
two sealing rings located within said bore one on each side of said stopcock, each of said sealing rings being arranged to contact said stopcock on an annular part of the sealing ring surface;
a shaft coupled to said stopcock and extending transversely of the cylindrical bore in said housing;
two axially extending insert rings located within and in coaxial relation with said bore one on each side of said stopcock and in contact with another annular part of the surface of the adjacent said sealing ring spaced from the annular part in contact with said stopcock, said insert rings having a coaxial length so that in combination with said sealing rings and said stopcock the axial dimension of the combination is greater than the axial length between the ends of said housing with the ends of said insert rings spaced outwardly from said sealing rings extending outwardly from the ends of said housing and disposed in displaceable contact with the adjacent said connecting sleeve and said connecting sleeves being in axially spaced relation to the adjacent end of said housing said insert rings being in slidable and rotatable engaging contact with the surface of the bore in said housing, uniformly angularly spaced recesses formed in said housing at each end thereof and opening into said bore, an annular groove formed in said bore adjacent each end thereof and each said recess opening into the adjacent said annular groove, lips formed on the bore at each end of said housing and extending radially inwardly toward the axis of said bore with each lip extending between a pair of said recesses;
uniformly angularly spaced guide-type dogs formed on the radially outer surface of each of said insert rings adjacent and spaced from the opposite end thereof from said sealing ring, each of said insert rings being axially slidable into said bore from an opposite end of said housing and each said guide-type dog being slidable through one of said recesses into said annular groove and being rotatable with said insert ring through said annular groove into position behind one of said lips for retaining said insert ring within said housing, and each of said insert rings with said guide dogs thereon being axially displaceable within the corresponding said annular groove, whereby said insert rings are retained in said housing when said coupling-nut means are displaced from attachment on said housing, said housing and insert rings being radially displaceable relative to the axis of the housing bore from said connecting sleeves and said sealing rings being adjustable from the extension of said stop valve without requiring disassembly of said stop valve and without causing axial displacement of said stopcock.

2. A stop valve according to claim 1 wherein the dimension of said annular groove in the axial direction of said bore exceeds the dimension of said guide-type dogs measured in the same axial direction.

3. A stop valve according to claim 2 wherein the dimension of said annular groove is approximately twice the corresponding dimension of said guide-type dogs.

4. A stop valve according to claim 1 wherein said guide-type dogs disposed on said outer surface of each of said insert rings adjacent to one of the ends thereof being elongated in the direction extending parallel to the adjacent end, and a corresponding contact-type dog for each said guide-type dog disposed on said outer surface and said contact-type dogs being elongated in the axial direction of said bore and extending transversely of the elongated direction of said guide-dog, and each of said contact-type dogs extending from the adjacent end of said insert ring and merging into the end of a different one of said guide-type dogs and said lips on the ends of said housing arranged for blocking continued rotational movement of said insert rings by contacting said contact-type dogs as said guide-type dogs are rotated from the recesses into alignment with said lips.

* * * * *

UNITED STATES PATENT OFFICE
CERTIFICATE OF CORRECTION

Patent No. 4059250      Dated November 22, 1977

Inventor(s) Erich Guldener et al

It is certified that error appears in the above-identified patent and that said Letters Patent are hereby corrected as shown below:

In the heading of the Letters Patent [73] should read as follows:

-- [73] Assignee: Georg Fischer Aktiengesellschaft, Schaffhausen, Switzerland--.

Signed and Sealed this

Sixth Day of June 1978

[SEAL]

Attest:

RUTH C. MASON
*Attesting Officer*

DONALD W. BANNER
*Commissioner of Patents and Trademarks*